Nov. 28, 1933.  T. GIBBY  1,937,016
POWER SHOVEL
Filed Nov. 15, 1932  4 Sheets-Sheet 1

INVENTOR.
Thomas Gibby
BY Watson E. Coleman
ATTORNEY.

Nov. 28, 1933.  T. GIBBY  1,937,016

POWER SHOVEL

Filed Nov. 15, 1932   4 Sheets-Sheet 2

INVENTOR.
Thomas Gibby
BY Watson E. Coleman
ATTORNEY.

Nov. 28, 1933.     T. GIBBY     1,937,016
POWER SHOVEL
Filed Nov. 15, 1932     4 Sheets-Sheet 3

INVENTOR.
Thomas Gibby
BY Watson E Coleman
ATTORNEY.

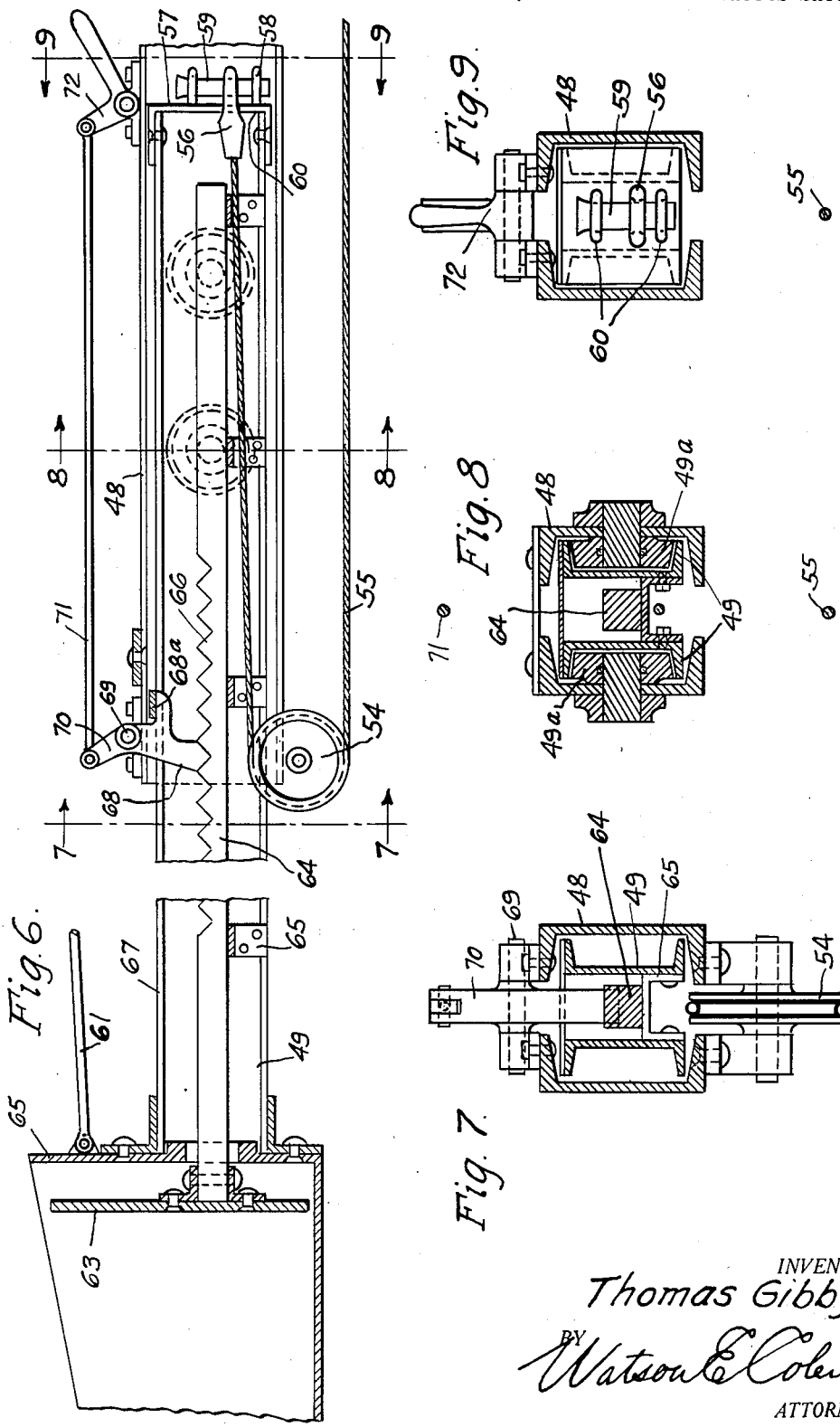

UNITED STATES PATENT OFFICE 1,937,016

POWER SHOVEL

Thomas Gibby, Denver, Colo.

Application November 15, 1932
Serial No. 642,801

5 Claims. (Cl. 214—135)

This invention relates to what are known as steam shovels or power shovels and particularly that general type of machine of this character wherein the shovel is mounted upon a beam movable longitudinally on the supporting frame, the supporting frame being mounted for rotatable movement upon a wheeled base.

The general object of my invention is to provide a shovel of this type in which a boom or beam carrying the shovel is formed of two telescopic elements, one of which carries the shovel, means being provided whereby the telescopic elements may be longitudinally extended to force the shovel into the material being acted on.

A further object is to provide means whereby the shovel carrying boom may be raised or lowered and whereby this boom may be swung around a circle for unloading purposes and a further object is to provide a plunger or pusher mounted within the shovel and means whereby this plunger may be forced forward with relation to the shovel to thereby discharge the material from the shovel.

Other objects will appear in the course of the following description.

My invention is illustrated in the accompanying drawings, wherein:—

Figure 6 is a longitudinal section through the boom or shovel supporting beam and the shovel itself;

Figure 7 is a section on the line 7—7 of Figure 6;

Figure 8 is a section on the line 8—8 of Figure 6;

Figure 9 is a section on the line 9—9 of Figure 6.

Figure 5:
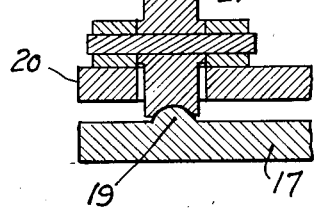
Figure 5 is a fragmentary section on the line 5—5 of Figure 4.

Referring to the drawings, it will be seen that the base of my loader includes the supporting beams 10. Upon these beams are mounted the forward and rear shafts 11 and 12. These shafts carry the wheels 13 over which the endless link elements 14 pass, thus providing a crawler by which the loader is moved forward or rearward. Also extending through the beams 10 is the intermediate shaft 15 carrying wheels 16 whereby the endless elements 14 are driven. Rollers 16a are mounted upon the beams 10 and support the upper flight of the endless elements 14. Mounted upon the beams 10 is a circular base 17 provided with the arcuate rack 18 upon its upper face and provided with a raised annular track 19 as illustrated in Figure 5. Disposed above the base 17 is the turn table 20. This is slotted at a plurality of points and mounted above these slots are the supporting rollers 21, one of which is shown in Figure 5 which engages the circular track 19 and thus supports the turn table upon the base.

Guides 22 mounted upon the beams 10 engage over the margin of this turn table so as to hold it to the track.

Extending upward from the turn table are the lateral uprights 23 supported on the turn table in any suitable manner and connected at their upper ends by the transverse spacing bolt 24. Mounted in suitable bearings upon the turn table 20 is a shaft 25 which carries upon it the toothed wheels 26 which engage with the arcuate rack 18. This shaft also carries upon it a sprocket wheel 27.

Mounted upon the rear of the turn table is a base 28 supporting upon it a motor 29. Any type of motor may be used but preferably I use an electric motor. I have not shown any details with regard to this matter as obviously the particular construction of the motor forms no part of my invention. Within the base 28 is any suitable speed reducing mechanism and power is illustrated as being transmitted from the motor 29 by means of a sprocket chain 30 to a sprocket wheel 31 on the speed reducer and from the speed reducer power is transmitted by means of a sprocket wheel 32 and the sprocket chain 33 to the sprocket wheel 27. By thus driving this shaft in one direction or the other, the turn table may be rotated in one direction or the other around its center, which center is the shaft 34. It will be understood that clutches are provided, as will be later stated, whereby the wheels 26 may be operatively connected to or disconnected from this shaft.

Mounted upon the upper end of the shaft 34 is a beveled gear wheel 35 and upon the lower end of this shaft a beveled gear wheel 36 which engages the beveled gear wheel 37 mounted upon the shaft 15. This shaft 15 carries on it a sprocket wheel 38 which is engaged through a sprocket chain 39 with the forward and rear shafts 11 and 12 to thus cause the machine to be driven forward or rearward.

Power is transmitted from the shaft 25 to the beveled gear wheel 35 by means of a beveled gear wheel 40 slidingly mounted upon the shaft 25. The gear wheel 40 is splined upon the shaft 25 and is capable of being shifted into or out of engagement with the gear wheel 35 through any suitable gear shifter.

Mounted upon the uprights 23 is a shaft 41 on which is splined a gear wheel 42 and fixed on the shaft 25 is a gear wheel 43. The gear wheel 42 is capable of being shifted into or out of engagement with the gear wheel 43 by any suitable gear shifting mechanism, as for instance, an ordinary gear shifting lever. When it is in engagement with the gear 43, it will drive the shaft 41. The shaft 41 also carries upon it a drum 44 and carried upon the uprights 23 above the shaft 41 is a shaft 45 carrying upon it the two drums 46 and 47.

Pivoted upon the uprights 23 for vertical movement is the shovel beam or boom section 48, the section 48 being tubular or hollow and formed with opposed channel irons and mounted within this section 48 is a second boom section 49 which telescopes within the section 48 and is also formed with opposed channel irons. Engaged with the section 48 is a clip 50 from which a cable 51 passes, this cable passing over a pulley 52 mounted upon upwardly and forwardly inclined uprights 53 in turn carried by the turn table at its forward end. The cable 51 passes over this pulley 52 and then extends rearward to the drum 46 upon which it is wound. The forward extremity of the boom section 48 also carries upon it the bracket 53 supporting a pulley 54 and over this pulley passes a cable 55 which at one end is connected to the drum 44 and which extends into the interior of the hollow beam or boom section 49 as illustrated in Figure 6 and at its rear end is connected to a clevis 56.

The rear end of the beam section 49 is closed by a plate 57 as shown in Figures 6 and 9, this plate having rearwardly extending eyes 58 and through these eyes passes a detachable pin 59 with which the clevis 56 is normally connected, the clevis extending through a slot 60 in the plate 57. By rotating the drum 44, it will be seen that the section 49 may be projected, the section 49 being supported for longitudinal movement by the rollers 49a on the section 48 and engaging within the channel irons or beams for the section 49, see Figure 8. For the purpose of retracting this boom section, I provide a cable 61 attached to the rear wall of the shovel 62, this cable extending to the drum 47. By this means, the extensible section 49' may be projected or retracted and by means of the cable 51, the booms may be raised or lowered.

The shovel is closed at its bottom, rear end and side but is open at its forward end and at its top and for the purpose of discharging the contents of the shovel, I provide a plunger plate 63, shown particularly in Figure 6 which is mounted upon a longitudinally extending rack bar 64 which extends through the back 62' of the shovel and into the hollow interior of the boom section 49. This is supported upon the guide brackets 65 and is formed on a portion of its upper face with the triangular teeth 66. The forward end of the boom or beam 49 is longitudinally slotted at 67 and mounted upon the forward extremity of the outermost boom section 48 is a pivoted latch 68 pivoted upon a bracket 69, the lower end of this latch being formed to fit between the teeth 66 and the upper end of the latch having an arm 70 which is engaged by a rod 71 extending rearward and pivotally connected to a manually operable bell crank lever 72. A stop 68a limits the rearward movement of the lower end of the latch 68.

When this lever is depressed, the latch is raised. When the lever is forced forward, the latch is forced downward into engagement with the toothed rod 64. The operation of this mechanism is as follows:—

Figure 1:
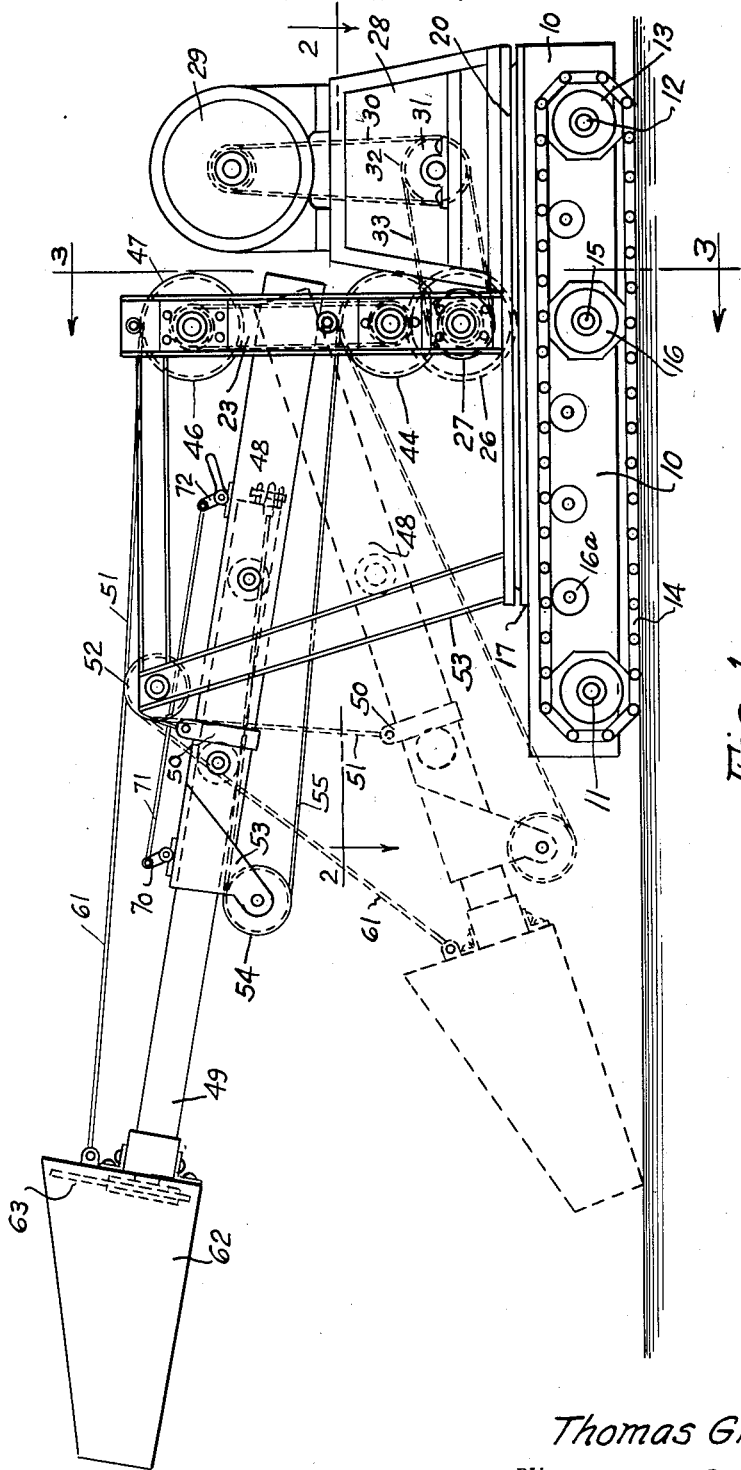
Figure 1 is a side elevation of my shoveling and loading machine.
Figure 2:
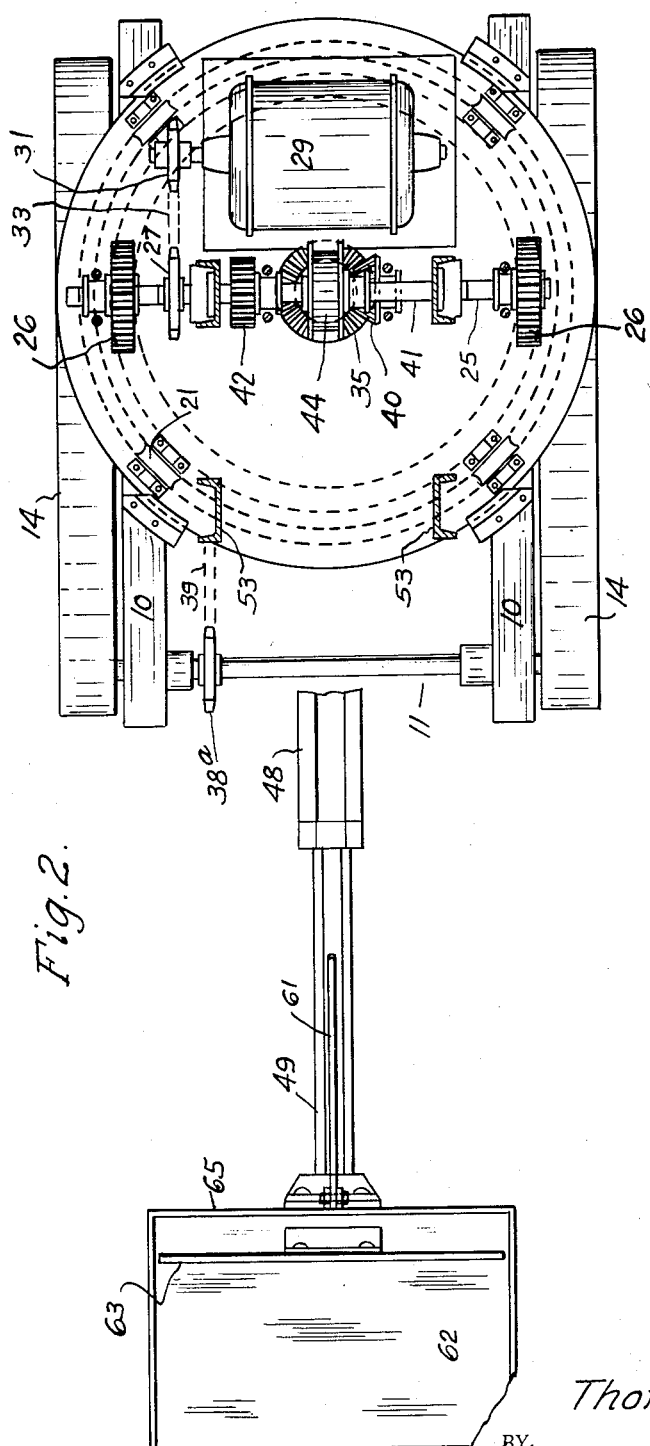
Figure 2 is a top plan view thereof, partly in section.
Figure 3:
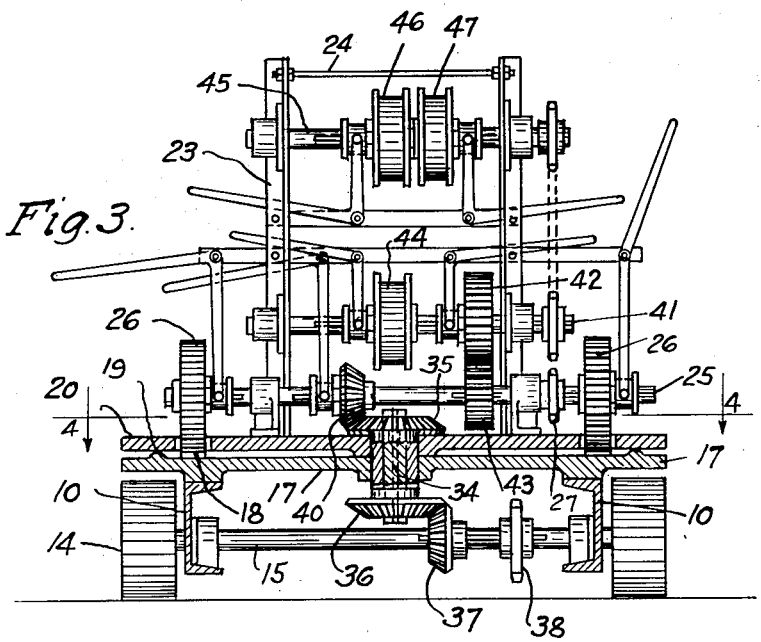
Figure 3 is a section on the line 3—3 of Figure 1.
Figure 4:
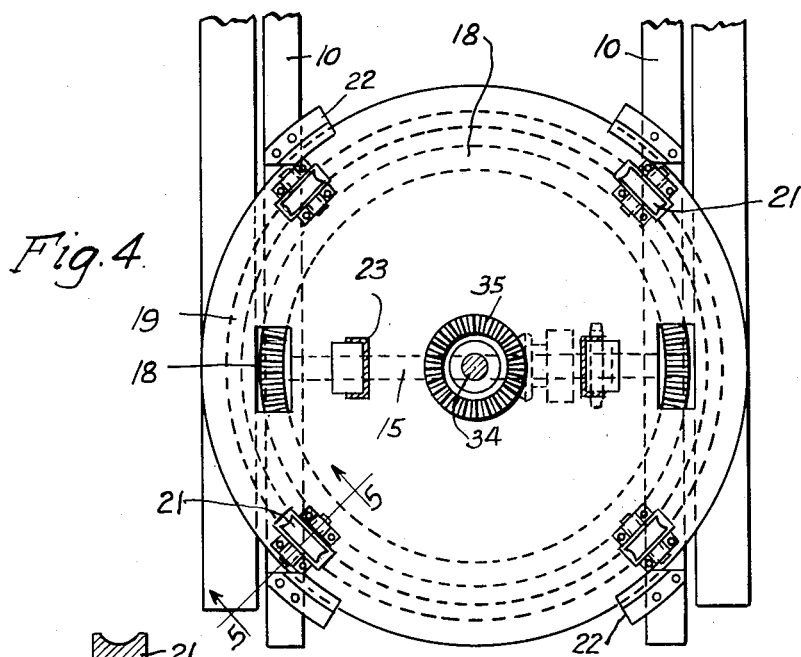
Figure 4 is a top plan view of the base.

For causing the travel of the machine as a whole, either for transporting the machine from place to place or moving the machine as a whole up to its work, the sliding gear 40 is thrown into mesh with the gear wheel 35 which, as illustrated in Figure 3, transmits power to the driving shaft of the tractor. Of course, under these circumstances, the gear 43 is out of mesh with the gear 42 and the gear wheels 26 are unclutched from the shaft 25. These gear wheels 26 are loose upon the shaft 25 but have clutches of any suitable character for engaging them with the shaft 25 or disengaging them therefrom. When it is desired to operate the loader, the boom is lowered by means of the cable 51, the drum 46 being unclutched from the shaft 45 and its rotation is resisted by any suitable brake mechanism. The shovel now being on the floor level, the drum 44 is engaged by its clutch with the shaft 41, the gear wheel 43 being thrown into mesh with the gear wheel 42. The rotation of the drum 44 acts through the cable 55 to shift the section 49 outward to thereby force the shovel into the earth, coal or other material being loaded or excavated. When the shovel is loaded and any obstruction such as a pit prop in underground workings occurs between the point of loading and the point of unloading, the clutch on drum 47 is thrown to connect the drum 47 to the shaft 45. This winds up on the cable 61 which causes a retraction of the boom section 49 and of the shovel. The boom section 49 is pulled back into the larger boom section 48 as far as may be necessary to clear the obstruction. At this time the latch 68 is held clear of the teeth on rack 64 by means of the pull back 71 and handle 72.

After the boom section 49 has been pulled back the required distance, the drum 46 is clutched to the shaft 45 to thus elevate the boom through the cable 51. The shovel is then swung into position for unloading by connecting one of the gear wheels 26 to the shaft 25 which will rotate the turn table toward the right or left depending upon which one of the gears 26 is clutched to the shaft. The shovel having been swung into position for unloading, if the boom 49 has been retracted too far to permit operation of the discharge plunger 63 said shovel must be projected from boom 48 a sufficient distance or a distance equal to the travel of plunger 63 to discharge the shovel. The trip rod 71 is released, allowing the latch 68 to engage the rack on the unloader arm 64, thus causing the plunger to remain in the fixed position. The cable 61 is then retracted by the drum 47 and since the plunger 63 is held stationary by the latch 68 and the shovel moves rearward, the contents of the shovel 14 will be discharged into the car or other receptacle.

I claim:—

1. A loading machine including a supporting frame, a boom formed of two sections one pivoted to the frame and the other being slidably engaged with the first named section and supporting a shovel at its outer end, means for raising or lowering the boom, means for projecting or retracting the slidable section of the boom, and manually controllable means for discharging the load from the shovel while the slidable section is being retracted including a plunger normally disposed within the rear end of the shovel, and manually operable means for holding said plunger from rearward movement when the shovel moves rearward or releasing the plunger for rearward movement with the shovel.

2. A loading machine including a supporting frame, a boom formed of two sections, one pivoted to the frame, the other section having telescopic engagement within the first-named section and supporting a shovel at its outer end, a winding drum and cable for raising or lowering the boom, a second winding drum and cable, a pulley mounted upon the outer end of the pivoted section of the boom and over which the cable passes, the cable engaging with the rear end of the slidable section of the boom whereby when the cable is retracted, the slidable section will be projected, a drum and cable wound thereon, the cable operatively engaging the outer end of the slidable section of the boom whereby the slidable section may be retracted, a motor, manually controllable means for operatively engaging any one of said drums with the motor and disengaging the other drums from the motor, and means for discharging the load from the shovel, comprising a plunger normally disposed within the rear end of the shovel, a rod extending rearward therefrom, and manually controllable means for holding the rod and plunger from rearward movement when the shovel moves rearward or releasing the plunger for rearward movement with the shovel.

3. A loading machine including a supporting frame, a boom formed of two sections, one pivoted to the frame, the other section having telescopic engagement within the first-named section and supporting a shovel at its outer end, a winding drum and cable for raising or lowering the boom, a second winding drum and cable, a pulley mounted upon the outer end of the pivoted section of the boom and over which the cable passes, the cable engaging with the rear end of the slidable section of the boom whereby when the cable is retracted, the slidable section will be projected, a drum and cable wound thereon, the cable operatively engaging the outer end of the slidable section of the boom whereby the slidable section may be retracted, a motor, manually controllable means for operatively engaging any one of said drums with the motor and disengaging the other drums from the motor, and means for discharging the load from the shovel, comprising a plunger normally disposed within the rear end of the shovel, a rod extending rearward therefrom, and manually controllable means for holding the rod and plunger from rearward movement when the shovel moves rearward comprising teeth on the rod, a latch mounted upon the pivoted section of the boom, and adapted to engage said teeth and hold the plunger and rod from movement, and manually operable means for raising or lowering the latch.

4. A loading machine of the character described, including a turn table, a base upon which the turn table is mounted, a tractor to which the base forms part, a motor mounted upon the turn table, gear wheels carried by the turn table and operatively engaging the base to rotate the turn table thereon, manually controlled means for connecting the motor to said gear wheels, vertical supports mounted upon the turn table, a boom formed in two sections, one of these sections being pivoted to the vertical supports for motion in a vertical plane, the other section having telescopic engagement with the first named section and carrying a shovel, a winding drum, a cable connected to the winding drum and to the first-named section of the boom whereby the boom may be raised or lowered, manually controllable means for connecting the motor to said drum, a second drum, a cable connected thereto and to the shovel whereby the telescopic section of the boom may be retracted, a pulley mounted upon the pivoted section of the boom at its outer end, a cable passing over said pulley and connected to the rear end of the slidable section of the boom, a winding drum over which said cable passes, manually controllable means for connecting this last named winding drum to the motor or disconnecting it therefrom, a plunger mounted within the rear end of the shovel, a plunger rod extending into the movable section of the boom and having teeth, a latch mounted upon the forward end of the pivoted section of the boom and extending into said movable section and engaging said teeth, and manually operable means for raising or lowering said latch.

5. A loading machine including a supporting frame, a boom formed of two sections, one pivoted to the frame and the other section being slidably engaged with the first named section and supporting a shovel at its outer end, means for raising or lowering the boom, means for projecting or retracting the slidable section of the boom, a plunger normally disposed within the rear end of the shovel, a rod extending rearward therefrom, and manually controllable means for holding the rod and plunger from rearward movement when the shovel moves rearward comprising a latch mounted upon the pivoted section of the boom and adapted when engaged with the plunger rod to hold the plunger and rod from rearward movement, and manually operable means for raising and lowering the latch.

THOMAS GIBBY.